March 13, 1956  F. A. KRUSEMARK  2,737,777
HYDRAULIC BRAKE BOOSTER
Filed Oct. 18, 1954
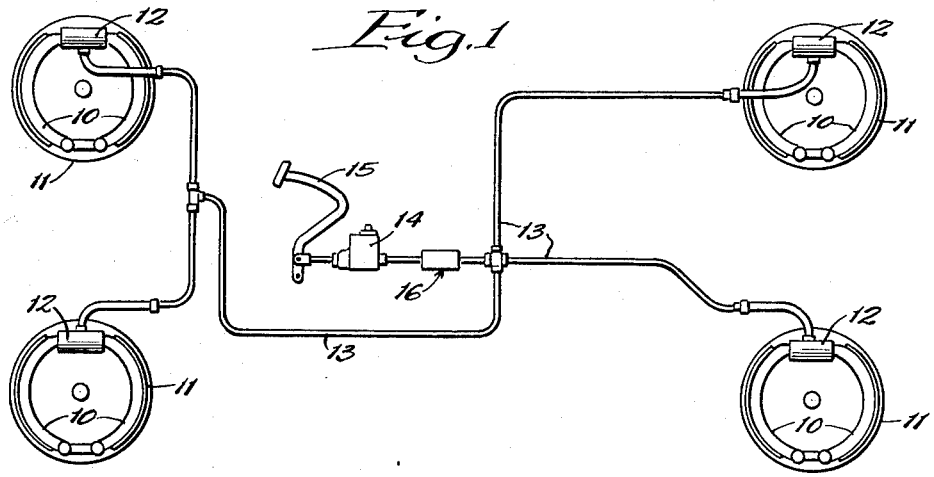
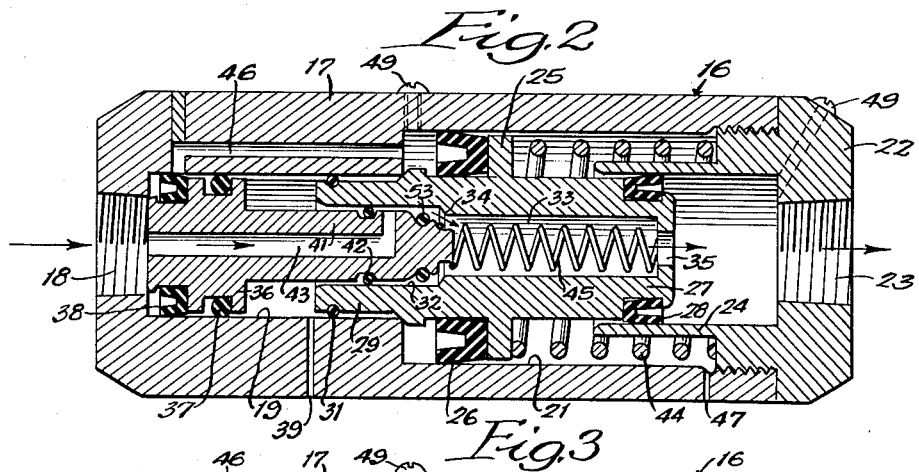
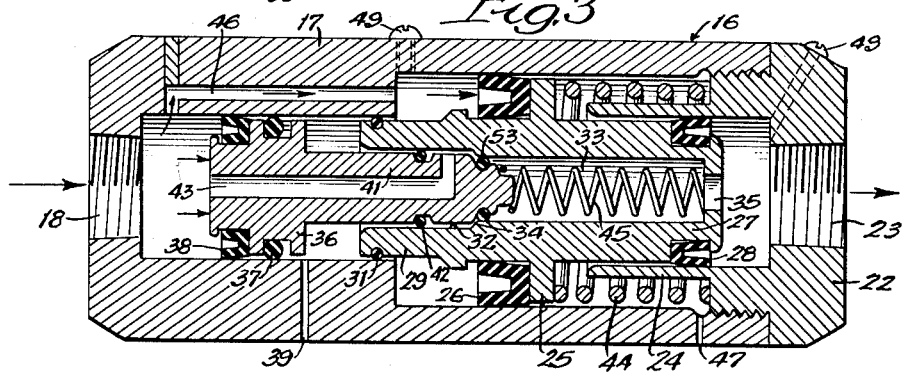
INVENTOR:
Frederick A. Krusemark,
BY
Bair, Freeman & Molinare
ATTORNEYS.

United States Patent Office 2,737,777
Patented Mar. 13, 1956

2,737,777

HYDRAULIC BRAKE BOOSTER

Frederick A. Krusemark, Oak Park, Ill., assignor to Santay Corporation

Application October 18, 1954, Serial No. 462,679

3 Claims. (Cl. 60—54.5)

This invention relates to a hydraulic brake booster and more particularly to a device for attachment to a conventional hydraulic brake system to decrease the pedal pressure required to effect a given brake application.

In a conventional hydraulic brake system, a relatively large amount of pedal pressure is required to apply the brakes and the amount of pressure necessary for an emergency application may be beyond the capabilities of a relatively weak or light weight driver. The mechanical advantage between the brake shoes and the pedal cannot be increased in a conventional system without producing objectionable and excessive pedal travel.

The use of external power has been resorted to in order to obtain the desired braking force with a relatively low pedal pressure and with permissible pedal travel. However, the installation of this type of brake is expensive and in many cases cannot be made in a resonable manner on existing automobiles. It has also been proposed to utilize a hydraulic booster mechanism which provides a relatively low mechanical advantage until the brake shoes engage the drum and then automatically shifts to a high mechanical advantage for the actual braking effect. The present invention relates to a hydraulic booster of the last mentioned type and has for its principal object the provision of such a booster which is simple and relatively inexpensive to manufacture, which is positive and extremely reliable in use and which is easy to install on either new or existing automobiles.

Another object is to provide a hydraulic brake booster in which the change of mechanical advantage is effected solely in response to fluid pressure developing in the system so that it is independent of brake wear or adjustment.

Still another object is to provide a hydraulic booster including a simple control valve operated with no lost pedal travel.

A further object is to provide a brake booster in which a minimum strength return spring is required so that substantially 100% of the force exerted on the pedal is effective to apply the brakes.

The above and other objects and features of the invention will be more readily apparent from the following description when read in connection with the accompanying drawing, in which:

Figure 1 is a diagrammatic view of a hydraulic brake system to which the booster of the present invention is applied;

Figure 2 is a sectional view through the booster showing the parts in brake released position; and Figure 3 is a view similar to Figure 2 showing the parts in brake applied position.

The booster of the present invention can be applied to a hydraulic braking system of any conventional type, as illustrated generally in Figure 1. Such a system may include a plurality of brake shoes 10 at the vehicle wheels adapted to be moved into engagement with brake drums 11 by means of wheel cylinders 12. Normally, the brake shoes are held spaced slightly from the drums 11 by return springs, not shown, and are adapted to be forced into frictional contact with the drums when fluid under pressure is supplied to the actuator cylinders 12.

The several actuator cylinders are connected through conduits 13 to a conventional master cylinder 14 operated by a brake pedal 15. When the pedal is depressed, the master cylinder will be operated to force fluid under pressure through the brake conduits 13 to apply the brakes. When the pedal is released, the return springs will disengage the brake shoes from the drums so that the vehicle may move freely.

The booster of the present invention is adapted to be inserted in series in the conduit system between the master cylinder and the wheel cylinders. As shown in Figure 1, the booster indicated generally at 16, may be connected directly in series in the conduits closely adjacent to the master cylinder.

As shown in Figures 2 and 3, the booster comprises a hollow casing 17 formed with an inlet connection 18 at one end and having a relatively small cylindrical bore 19 adjacent to said end in open communication with the connection 18. Inward of the bore 19 the casing is formed with a large intermediate bore 21 coaxial with the bore 18 and extending to the opposite end of the casing. The opposite end of the casing is closed by a closure plug 22 having an outlet connection 23 at its center and formed with a tubular coaxial sleeve 24 extending into the end of the casing and defining therein a coaxial bore of approximately the same size as the bore 19.

A compound piston is adapted to be mounted in the casing and is provided with an enlarged portion 25 fitting in the enlarged bore 21 and sealed thereagainst by a cup washer 26. A small portion 27 of the compound piston fits in the bore 24 and is sealed therein by a cup washer 28. The compound piston includes an end portion 29 extending into the bore 19 and sealed therein by an O-ring 31. The compound piston has a passage therethrough, including a relatively large cylindrical portion 32 adjacent the inlet end, a smaller portion 33 joining the portion 32 through a tapered shoulder 34 and a reduced outlet opening 35 at the outlet end.

The bore 19 receives a second piston having an enlarged head portion 36 fitting into the bore 19 and sealed therein by an O-ring 37 and a cup washer 38. The space between the head 36 and the seal 31 is preferably vented, as indicated at 39. The second piston includes a reduced extension 41 extending into the bore 32 and sealed therein by an O-ring 42. A passage 43 extends through the second piston and opens beyond the O-ring 42 normally to communicate past the shoulder 34 with the passage 33. The end of the second piston terminates in a reduced projection carrying a sealing ring 53 which will pass the shoulder 34 to close the passage 33 when the second piston is advanced, as shown in Figure 3.

The two pistons are normally urged to the position shown in Figure 2 by a spring 44 which acts between the enclosure 22 and the compound piston to urge it to the left and a spring 45 lying within the passage 33 and urging the second piston to the left. When the second piston is in the left position, as shown, the cup washer 38 thereon closes a passage 46 formed in the body between the inlet end of the bore 19 and the inlet end of the bore 21. The space between the enlarged portion 25 of the compound piston and the sleeve 24 is vented, as shown at 47, and suitable bleed passages closed by screw type valve members may be provided, as indicated at 49 to bleed air from the booster.

In normal use, when the brakes are released, the booster parts will occupy the position shown in Figure 2 so that liquid from the wheel cylinders can return to the master cylinder from the outlet connection 23 through the passages 33, 32 and 43 to the inlet connection 18 and thence to the master cylinder. When the brakes are to be applied, liquid forced under pressure from the master cylinder will enter the inlet connection 18 and will flow through the passages 43, 32 and 33 to the outlet connection 23 and the wheel cylinders. When the brake shoes engage the drums, resistance to movement will increase sharply so that the fluid pressure at the outlet connection 23 will go up. Since the outlet connection is in open communication at this time with the inlet connection, the same pressure will act on the left or large end 36 of the piston and on the reduced extension 41 thereof. When the pressure reaches a value such that the force produced on the second piston due to the differential areas at its opposite ends is greater than the force exerted by the spring 45, the second piston will move toward the right to the position shown in Figure 3.

In the initial part of its movement, the seal 53 will pass the shoulder 34 to close the passage 33 and substantially simultaneously therewith or immediately thereafter, the passage 46 will be opened so that liquid from the inlet port can flow therethrough to act on the enlarged end 25 of the compound piston. At this time, inlet liquid under pressure will be acting over the area of the enlarged end 36 of the second piston and the enlarged end 25 of the compound piston and the second piston will tend to move the compound piston to the right through engagement of the extension 41 thereof with the shoulder 34. The total displaced area of the enlarged portion 25 of the compound piston may be made in any desired ratio to the area of the small end 27 thereof and is preferably about twice the area. Therefore, the small end 27 of the compound piston will displace one-half of the volume of liquid entering the inlet connection 18 but will develop approximately twice the pressure. Therefore a high applying force can be transmitted to the wheel brakes with relatively less pedal effort and without increasing the pedal travel since there will be substantially no motion after the brake shoes engage the drums.

In the present construction, the springs 44 and 45 can be made relatively light. The spring 45 serves to return the second piston to the left and to hold it in its initial position until the brake applying pressure reaches the required minimum value and since the differential area may be relatively small, this spring need not be heavy. The spring 44 must be somewhat heavier than the spring 45 to insure that the compound piston will not move ahead of the second piston, but otherwise need only be strong enough to overcome friction and to return the compound piston to the left. Therefore, a very efficient unit involving a minimum loss of pressure due to overcoming springs is provided.

While one embodiment of the invention has been shown and described herein, it will be understood that it is illustrative only and not to be taken as a definition of the scope of the invention, reference being had for this purpose to the appended claims.

What is claimed is:

1. A hydraulic brake booster to be inserted in a hydraulic braking system between the master cylinder and the wheel cylinders comprising a hollow casing having a liquid inlet at one end connected to the master cylinder and a liquid outlet at the other end connected to the wheel cylinders, the casing being formed with aligned inlet and outlet bores communicating with the liquid inlet and outlet respectively and an intermediate bore larger than the inlet and outlet bores, there being a passage in the casing connecting the inlet bore with the intermediate bore and terminating in an inlet port in the inlet bore, a compound piston having a small portion fitting in the outlet bore and a large portion fitting in the intermediate bore and having a flow passage therethrough, a second piston in the inlet bore having a passage therethrough and including a valve portion to close the passage in the compound piston, and a spring urging the second piston toward the inlet to a position to close said inlet port and to open the passage in the compound piston, pressure acting on the second piston moving it to open said inlet port and to close the passage in the compound piston.

2. A hydraulic brake booster to be inserted in a hydraulic braking system between the master cylinder and the wheel cylinders comprising a hollow casing having a liquid inlet at one end connected to the master cylinder and a liquid outlet at the other end connected to the wheel cylinders, the casing being formed with aligned inlet and outlet bores communicating with the liquid inlet and outlet respectively and an intermediate bore larger than the inlet and outlet bores, there being a passage in the casing connecting the inlet bore with the intermediate bore and terminating in an inlet port in the inlet bore, a compound piston having a small portion fitting in the outlet bore and a large portion fitting in the intermediate bore and having an axial passage therethrough formed with a valve seat intermediate its ends, a second compound piston having a large portion fitting in the inlet bore and a small portion fitting in the axial passage and a valve member at the end of the small portion to close the valve seat, there being a passage through the second piston communicating through the valve seat and the axial passage with the outlet bore, and a spring urging the second piston toward the inlet to a position to close said inlet port and to move the valve member away from the seat.

3. A hydraulic brake booster to be inserted in a hydraulic braking system between the master cylinder and the wheel cylinders comprising a hollow casing having a liquid inlet at one end connected to the master cylinder and a liquid outlet at the other end connected to the wheel cylinders, the casing being formed with aligned inlet and outlet bores communicating with the liquid inlet and outlet respectively and an intermediate bore larger than the inlet and outlet bores, there being a passage in the casing connecting the inlet bore with the intermediate bore and terminating in an inlet port in the inlet bore, a compound piston having a small portion fitting in the outlet bore and a large portion fitting in the intermediate bore and having an axial passage therethrough formed with a valve seat intermediate its ends, a second compound piston having a large portion fitting in the inlet bore and a small portion fitting in the axial passage and a valve member at the end of the small portion to close the valve seat, there being a passage through the second piston communicating through the valve seat and the axial passage with the outlet bore, a spring urging the compound piston toward the inlet, and a spring lighter than the last named spring acting between the compound piston and the second piston urging the second piston toward the inlet to a position to cover the inlet port and move the valve member away from the valve seat.

References Cited in the file of this patent

UNITED STATES PATENTS 2,381,930    Schnell _____ Aug. 14, 1945